United States Patent [19]

Chen

[11] Patent Number: 5,359,550
[45] Date of Patent: Oct. 25, 1994

[54] NOTEBOOK COMPUTER SYSTEM FOR COOPERATING WITH PROJECTORS

[76] Inventor: Chin-Mao Chen, No. 36, Lane 90, Chiao Hsin Rd., Hsin Tien City, Taipei Hsien, Taiwan

[21] Appl. No.: 95,715

[22] Filed: Jul. 21, 1993

[51] Int. Cl.⁵ .......................... G06F 1/00; G03B 21/00
[52] U.S. Cl. .......................... 364/708.1; 353/DIG. 5
[58] Field of Search .................... 364/708.1; 353/119, 353/122, DIG. 3, DIG. 5

[56] References Cited

U.S. PATENT DOCUMENTS

| | | | |
|---|---|---|---|
| 3,110,217 | 11/1963 | Millner et al. | 353/112 |
| 3,264,936 | 8/1966 | Schultz et al. | 353/DIG. 5 |
| 3,544,211 | 12/1970 | Albee, Jr. | 353/DIG. 5 |
| 3,594,082 | 7/1971 | Lonchar | 353/113 |
| 4,846,694 | 7/1989 | Erhardt | 353/122 |
| 4,944,578 | 7/1990 | Denison | 353/122 X |
| 5,035,502 | 7/1991 | Stokes | 353/122 |
| 5,041,965 | 8/1991 | Chen | 353/122 X |
| 5,138,700 | 8/1992 | Kinoshita | 353/42 |
| 5,198,846 | 3/1993 | Zilber | 353/DIG. 5 |
| 5,231,434 | 7/1993 | Kennedy et al. | 353/122 |

*Primary Examiner*—Tan V. Mai
*Attorney, Agent, or Firm*—Poms, Smith, Lande & Rose

[57] ABSTRACT

A notebook computer set for cooperating with projectors. The notebook computer set has a notebook computer pivotally connected with a liquid crystal display (LCD) pivotally connected with a cover. The notebook computer set also has a bracket attached to the housings of the projectors for carrying the notebook computer so that the LCD is sited on the panels of the projectors.

7 Claims, 3 Drawing Sheets

NOTEBOOK COMPUTER SYSTEM FOR COOPERATING WITH PROJECTORS

BACKGROUND OF INVENTION

FIELD OF INVENTION

The present invention relates to a notebook computer set for cooperating with projectors.

RELATED PRIOR ART

Notebook computers, employing liquid crystal displays (LCD) are useful for businessmen and salesmen who have to travel with considerable amounts of information from one office to another office. To retrieve information from notebook computers, information stored therein can be printed on sheets or shown on LCDs. In briefs, conferences, meetings and seminars, it is often desired to project information onto screens.

In the past, notebook computers were manufactured so as to employ LCDs to which covers were firmly attached. Covers cannot be detached from LCDs. Although LCDs can be sited on panels of projectors, light is sheltered by means of covers firmly attached to LCDs. Information shown in LCDs cannot be projected onto screens by means of projectors. To solve this problem, firstly, information was printed on sheets of paper. Secondly, information printed on sheets of paper was copied onto transparent films. Finally, information printed on transparent films could be projected onto screens by means of projectors. But, this approach is inconvenient as it requires so many steps.

There have been some auxiliary LCDs which can be linked to notebook computers by means of cables for solving the above-mentioned problem. Such auxiliary LCDs are not connected to any covers so that light can pass through them when they are sited on panels of projectors. That is, information shown on the auxiliary LCD can be projected onto screens by means of projectors. This approach may save time, but it brings further burdens for users to carry auxiliary LCDs and cables.

To solve the above-mentioned problem, a notebook computer employing a LCD detachably attached thereto. A cover is detachably attached to such a LCD. Such a notebook computer has two female terminals and a corresponding LCD has two male terminals. The notebook computer also has a port and the LCD also has a port. Normally, the LCD is pivotally mounted on the notebook computer with the male terminals of the former engaged in the female terminals of the latter. To cooperate with projectors, the LCD is detached from the notebook computer. At that instant, the LCD is operatively linked to the notebook computer by means of a cable with a first terminal engaged with the port of the LCD and a second terminal engaged with the port of the notebook computer. The cover is detached from the LCD. The LCD is sited on panels of projectors so that information shown on the LCD is projected onto screens by means of projectors.

This approach provides a more compact assembly. However, it is difficult to detach the LCD from the notebook computer without experience as the LCD is detachable from the notebook computer only if the LCD is pivoted to a certain angle relative to the notebook computer. The ports of the LCD and the notebook computer and the terminals of the cable may be soon worn out as they are engaged with and disengaged from each other very often. The terminals of the LCD and the notebook computer may not be electrically coupled with each other well as they are engaged with and disengaged from each other very often. Furthermore, the LCD may be broken by means of static electricity of users or other parts of notebook computers.

Therefore, the present invention is intended to solve the above-mentioned problem.

SUMMARY OF INVENTION

It is an object of the present invention to provide a notebook computer for cooperating with projectors. The notebook computer set has a notebook computer pivotally connected with a liquid crystal display (LCD) detachably connected with a cover. The notebook computer set also has a bracket attached to the housings of the projectors for carrying the notebook computer so that the LCD is sited on the panels of the projectors.

For a better understanding of the present invention and objects thereof, a study of the detailed description of the embodiments described hereinafter should be made in relation to the accompanying drawings.

BRIEF DESCRIPTION OF DRAWINGS

The present invention will be described in detail with reference to attached drawings, wherein.

DETAILED DESCRIPTION OF PREFERRED EMBODIMENT

Figure 1:
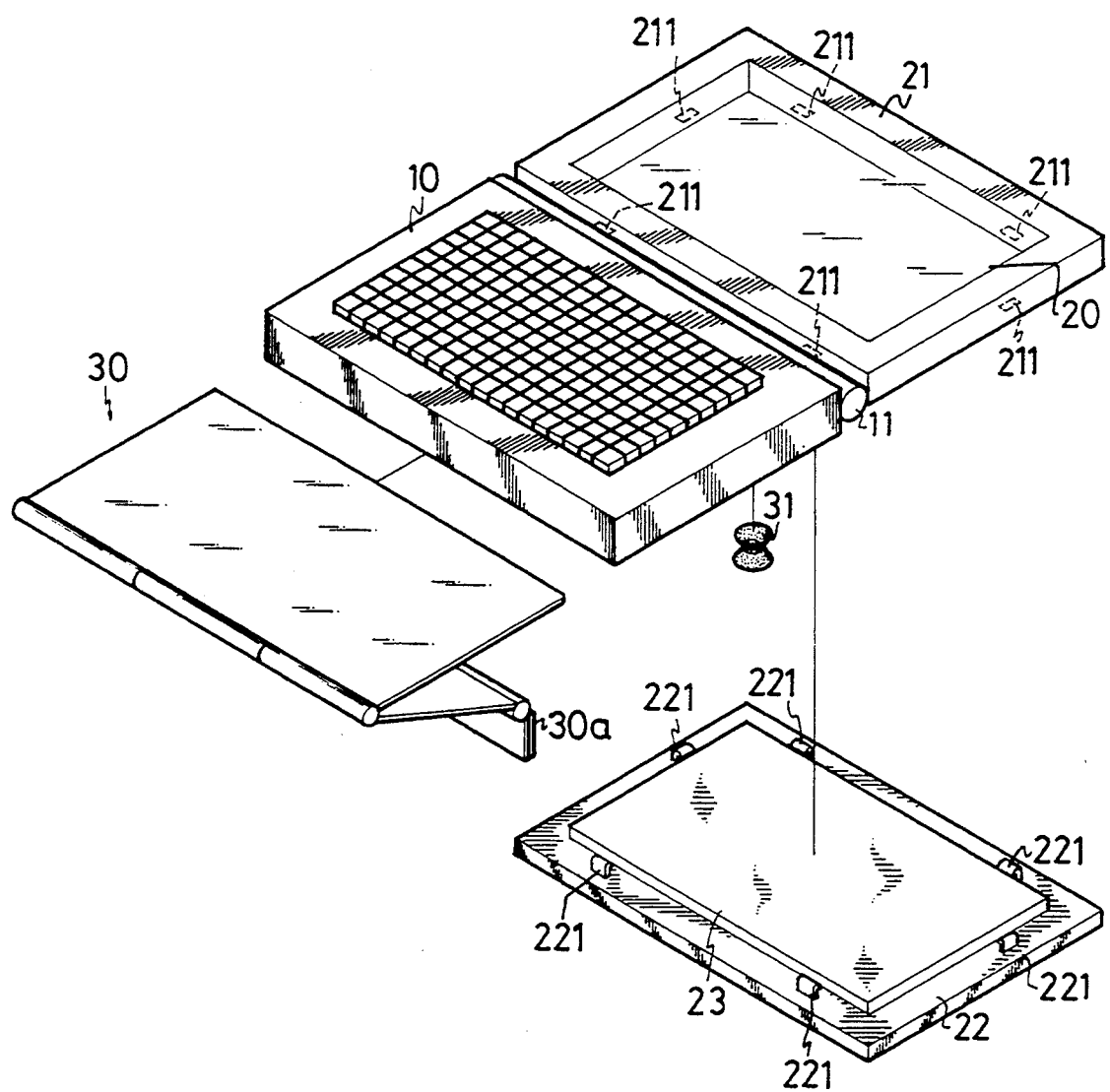
FIG. 1 is an exploded view of a notebook computer set according to a first embodiment of the present invention.

Initially referring to FIG. 1 of the drawings, a notebook computer set for cooperating with projectors has a notebook computer 10 pivotally connected with a liquid crystal display (LCD) 20. The way wherein the notebook computer 10 is pivotally attached to the LCD 20 is well known and, therefore, further detailed description thereof is not necessary.

The LCD 20 is enclosed by means of a frame 21. Several recesses 211 are formed in the frame 21 such that they face downward when the LCD 20 is pivoted to 180° relative to the notebook computer 10.

A cover 22 has a profile corresponding to the frame 21. The plate 23 corresponding to the LCD 20 is formed on the cover 22. Several hooks 221, corresponding to the recesses 211, are formed on the cover 20.

When the LCD 20 and the frame 21 are covered by means of the cover 22, the plate 23 is sited within the frame 21. The cover 22 is detachably attached to the frame 21 with the hooks 221 engaged in the recesses 211. The plate 23 ensures that information shown on the LCD 20 is clearly visible in normal an operation of the LCD 20.

A bracket 30 consists of a first member pivotally connected, by means of a hinge portion, to a second member pivotally connected, by means of another hinge portion, to a third member. A magnet 30a is adhered on a side of the third member of the bracket 30.

Figure 2:
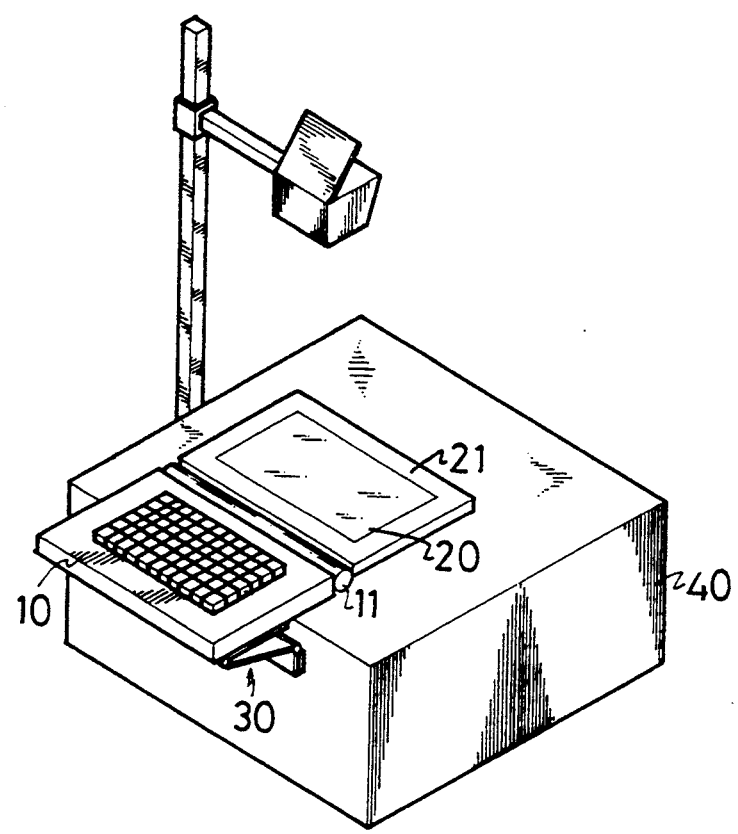
FIG. 2 is a perspective view of the notebook computer set in accordance with the first embodiment of the present invention, mounted on a projector.

Additionally referring to FIG. 2 of the drawings, a projector 40 has a housing made of ferromagnetic materials for carrying a panel. The notebook computer 10 is mounted on the housing of the projector 40 so that the LCD 20 is sited on the panel of the projector 40.

Figure 3:
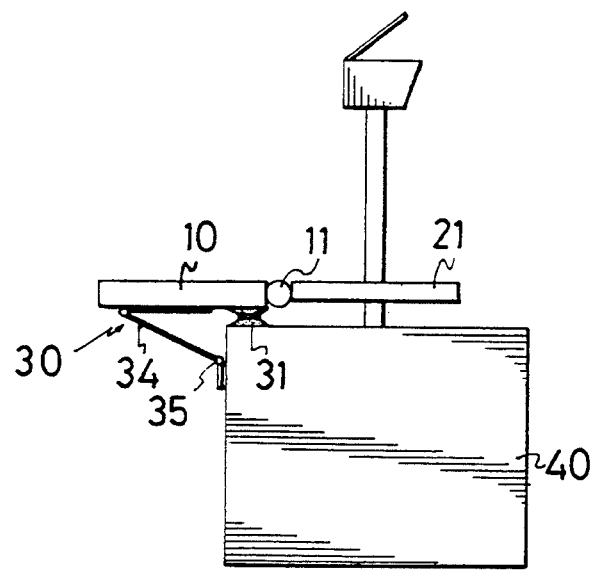
FIG. 3 is a right side view of the notebook computer set in accordance with the first embodiment of the present invention, mounted on a projector.

Additionally referring to FIG. 3 of the drawings, the magnet 30a is attached to the housing of the projector 40 so that the bracket 30 is mounted to the housing of the projector 40. The first member of the bracket 30 is sited in a horizontal position. Two suckers 31 are attached on the panel of the projector 40. The notebook computer 10 is then sited on the first member of the bracket 30 and the sucker 31 such that the center of the LCD substantially 20 aligns with the center of the panel of the projector 40.

Figure 4:
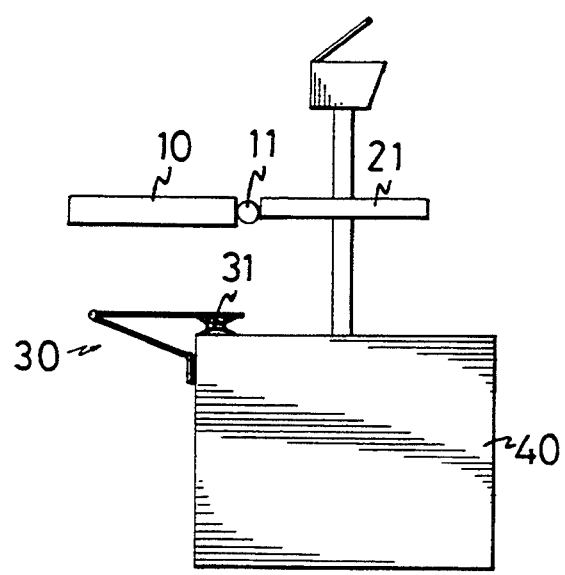
FIG. 4 is a right side view of a notebook computer set in accordance with second embodiment of the present invention, mounted on a projector.

Additionally referring to FIG. 4 of the drawings, in accordance with a second embodiment of the present invention, the dimension of the first member of the bracket 30 is relatively large so that it is sited over the panel of the projector 40 when the magnet 30a is attached to the housing of the projector 40. The suckers 31 are attached between the first member of the bracket 30 and the panel of the projector 40. The notebook computer 10 is mounted on the first member of the bracket 30 such that the center of the LCD substantially 20 aligns with the center of the panel of the projector 40.

If the housing of the projector 40 is not made of ferromagnetic materials, the magnet 30a will not function to mount the bracket 30 to the housing of the projector 40. In this case, the magnet 30a can be replaced by means of several suckers for mounting the bracket 30 to the housing of the projector 40.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A notebook computer set for cooperating with a projector, comprising:

a notebook computer;

a transparent liquid crystal display pivotally attached to said notebook computer;

a bracket of the projectors for carrying said notebook computer so comprising a first member, a second member hinged to the first member and a third member hinged to the second member; and a magnet firmly attached to the third member of the bracket;

whereby the magnet attaches the third member of the bracket to a housing of the projector so that the second member of the bracket supports the first member of the bracket in order to support the notebook computer so that the liquid crystal display is disposed on a panel of the projector.

2. A notebook computer set in accordance with claim 1, wherein said liquid crystal display is enclosed by means .at a frame comprising a number of recesses formed therein.

3. A notebook computer set in accordance with claim 2, wherein said cover is formed with a number of hooks for engaging in said recesses.

4. A notebook computer set in accordance with claim 1, wherein said first member of said bracket is not sited over the panels of the projectors when said third member of said bracket is attached to the housings of the projectors.

5. A notebook computer set in accordance with claim 4, further comprising a number of suckers attached between said notebook computer and the panels of the projectors.

6. A notebook computer set in accordance with claim 1, wherein said first member of said bracket is sited over the panels of the projectors when said third member of said bracket is attached to the housings of the projectors.

7. A notebook computer set for cooperating with a projector, comprising:

a notebook computer;

a transparent liquid crystal display pivotally attached to said notebook computer;

a bracket comprising a first member, a second member hinged to the first member and a third member hinged to the second member; and a sucker firmly attached to the third member of the bracket;

whereby the sucker attaches the third member of the bracket to a housing of the projector so that the second member of the bracket supports the first member of the bracket in order to support the notebook computer so that the liquid crystal display is disposed on a panel of the projector.

* * * * *